June 11, 1940.  G. BARTH  2,204,292

DIRECTIONAL INDICATING MEANS

Filed June 4, 1938  2 Sheets-Sheet 1

INVENTOR.
Gustav Barth
BY Stephen Cerstvik
ATTORNEY.

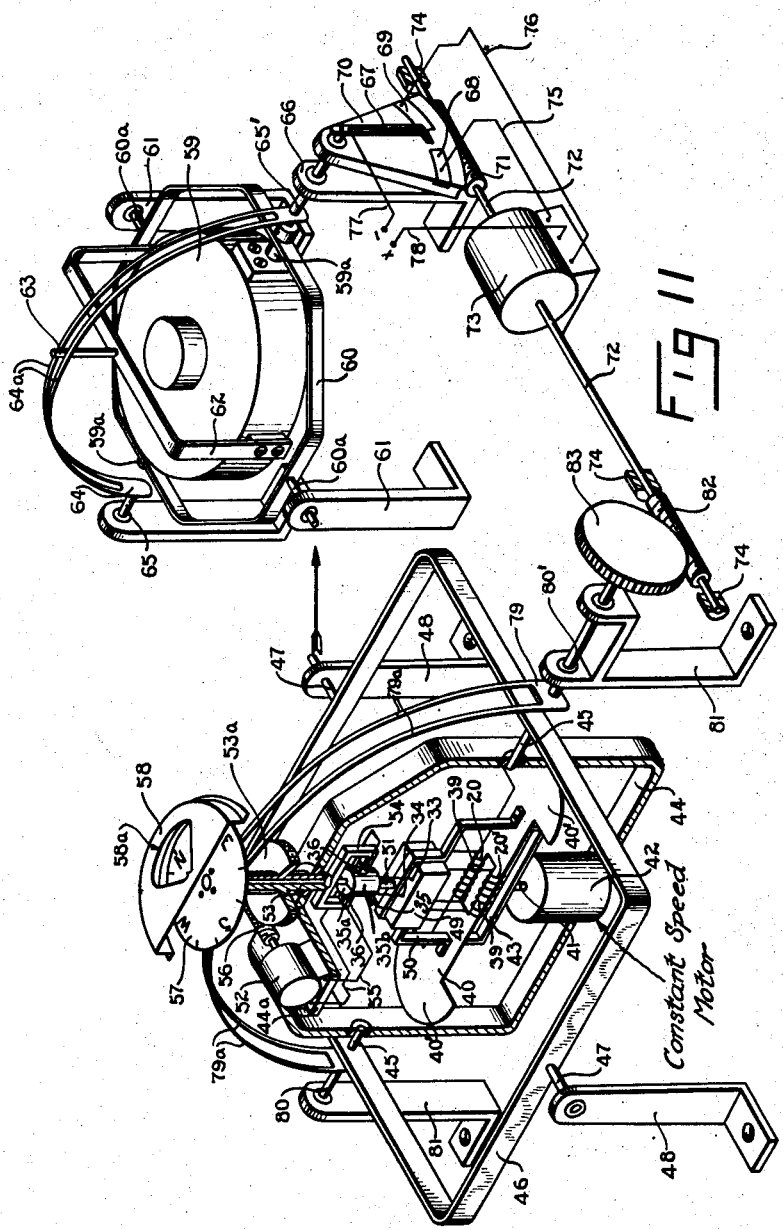

Patented June 11, 1940

2,204,292

UNITED STATES PATENT OFFICE 2,204,292

DIRECTION INDICATING MEANS

Gustav Barth, Berlin, Germany, assignor to Siemens Apparate und Maschinen Gesellschaft mit beschränkter Haftung, Berlin, Germany, a corporation of Germany Application June 4, 1938, Serial No. 211,912
In Germany July 13, 1937

5 Claims. (Cl. 33—204)

This invention relates to direction indicating means, and more particularly to apparatus for indicating the position of an object relative to a magnetic field, for example, the terrestrial magnetic field.

One of the objects of the present invention is to provide novel means adapted for use in navigation for indicating the direction of the magnetic north and the course of a vehicle, such as an aircraft, relative thereto.

Another object is to provide novel means for producing a continuous indication of the magnetic north.

A further object is to provide novel means of the above character employing a rotating armature which coacts with the terrestrial magnetic field to determine the direction of said field.

An additional object is to provide novel means of the above character which are sensitive to minute changes of course of the vehicle upon which the means are mounted.

Another object is to provide novel means of the above character employing coils rotating in the terrestrial field wherein the succession of changes of electrical magnitudes in said coils indicates the direction of said field.

An additional object is to provide novel direction indicating means which are not influenced by changes in attitude of the vehicle upon which the means are mounted.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention, reference for this latter purpose being had primarily to the appended claims.

In the drawings, wherein like reference characters refer to like parts throughout the several views, Fig. 1 is a view of a core and coil which may be employed with the present invention;

The form of the invention illustrated in the accompanying drawings, by way of example, is a device for indicating the position of an object relative to a magnetic field, for example, the earth's magnetic field. The device is constituted by one or a plurality of coils for which suitable cores are provided which are of highly magnetic transmissive material. In these cores, a periodically varying magnetic field is produced by means of an alternating current, a partially rectified alternating current, or an interrupted direct current. The electrical disturbance produced within the core by the coaction of the alternating field of said core with the terrestrial field, changes the electro-motive force of self-induction of the coil and thus alters the impedance of the circuit an amount corresponding to the strength of the coacting terrestrial magnetic component. When the coil arrangement is rotated in a horizontal plane in this field the arrangement constitutes a form of generator having a rotating armature. A direct measurement of the angular position of an object relative to the terrestrial field may be obtained from the succession of the changes of the electrical current which take place in the rotating coils.

Figure 1:
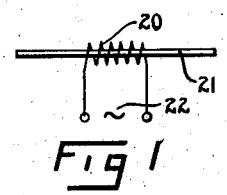

In the form shown in Fig. 1, a coil 20 surrounds a core 21 which may be rotated as above mentioned in the terrestrial field. Core 21 is preferably of circular cross-section having a small diameter relative to the length and is of highly magnetic transmissive material, for example, permalloy. Coil 20 is disposed preferably at the center of said core and is energized by alternating current from a source 22.

Figure 2:
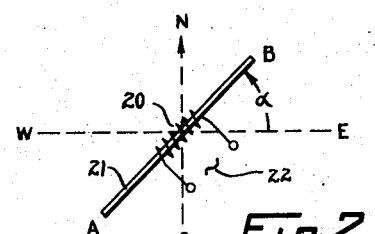
Fig. 2 is a diagram illustrating the position of magnetic core and coil relative to a magnetic meridian.
Figure 3:
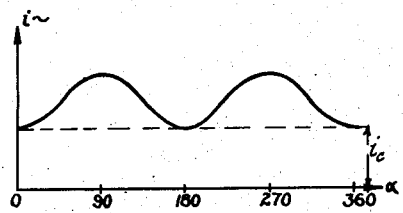
Fig. 3 is a diagram of the effective current flowing in the coil of Fig. 2 during one revolution of said coil in a magnetic field.

In Fig. 2, coil 20 is shown in a position relative to the earth's field designated N—S. If coil 20 is to constitute in effect a rotating armature in the earth's field and if the direction of said field is to be determined by electrical changes occurring in said armature, there must be a proper periodic flux linkage therebetween. Consequently, coil 20 when rotated is maintained in a horizontal plane by stabilizing means to be later described. The rotation occurs about an axis perpendicular to the coil and preferably in the center thereof. When said coil is perpendicular to the earth's field, no flux linkage occurs and the current flowing in the coil is equal to the effective current produced by source 22, for example, $i_0$. However, if the coil is angularly displaced from the position at right angles to said field through an angle $\alpha$, in the direction of the arrow, the coacting component of the terrestrial field changes the impedance of the coil to the alternating current and the effective value of the current flowing therein will be changed, for example, from $i_0$ to $i_a$. By the same token, as the rotation of the bar B continues, maximum current will be induced in the coil when the latter reaches an N—S position, at which point the maximum field is being cut. To better understand this theory of induced currents from the earth's magnetic field, reference is made to Fig. 3 wherein the reference point signifies the mean effective value of the alternating current, as would be registered by an A. C. ammeter in the circuit, traversing the coil due to source 22 when the bar is in the E—W position. Taking this effective value of current traversing the coil, as a reference point, as the bar is rotated to an N—S position the induced maximum current will have the value shown in Fig. 3 by the ordinate 90. As rotation of bar B continues away from the N position, the flux density traversed decreases until a null point is reached in the W—E position where no current is induced. This value is indicated as the low point of the curve shown in Fig. 3 at the 180 ordinate. During one-half of a revolution of bar B the induced current has passed from zero to a maximum and back to zero. The same action takes place as the bar continues to rotate from the W position to the S position and back to the E position as will readily appear upon reference to the curve shown in Fig. 3. It will be apparent, therefore, that as the bar is rotated one complete revolution two maximum points are present, one being at 90° rotation and the other at 270° rotation.

Figure 4:
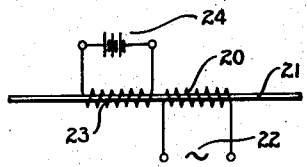
Fig. 4 is a view of a second form of core with associated coils which may be employed in the invention.
Figure 5:
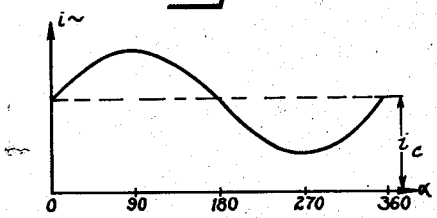
Fig. 5 is a diagram of the effective current flowing in one of the coils of Fig. 4 during one revolution thereof in a magnetic field.
Figure 6:
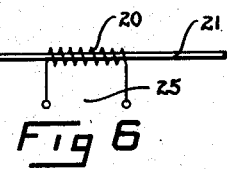
Fig. 6 is a view of a core and coil similar in construction to that shown in Fig. 1 but energized differently.
Figure 7:
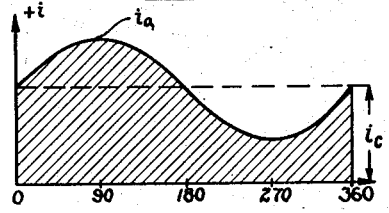
Fig. 7 is a diagram of the current flowing in the coil of Fig. 6 during one revolution of said coil in a magnetic field.

The coil arrangement of Figs. 1 and 2, however, is not satisfactory for direction indications because the frequency being determined by only one-half a revolution, the succession of current changes does not determine which is the north and which is the south pole of the coacting field. For this reason, means are provided for producing a current having a frequency determined by a full revolution of the coil 20, wherein the polarity of the terrestrial, or any coacting field, may be determined at any point in the cycle of the coil current. The means may be constituted by a suitable arrangement of permanent magnets but here comprise a supplementary or pre-magnetizing coil 23 (Fig. 4) which is energized by direct current from a source 24. The direct current produces a magnetic field of uniform direction which links both coil 20 and core 21 and acts in conjunction with the earth's field during one-half a revolution and in opposition to the latter field during the other half revolution. This function, due to the introduction of the direct current into the circuit, will be better understood if fluxes alone are considered. Referring now to Fig. 4, it may be said, that since the direct current in coil 23 will exert a unidirectional field, the flux will be constant and may be considered as acting in a W direction. As the bar rotates, therefore, toward the N position, the earth's field increasingly traverses the bar and the flux set up by the coil 23 acts additively with the earth's field. As the bar moves toward the W position, the earth's field decreases but the field of coil 23 acts additively therewith until the W position is reached and a null point results. Reference is made, for a better understanding, to Fig. 5 where the point, as at the 180° ordinate, indicates the null point and the curve between the 0 ordinate and the 180° ordinate indicates the aiding action of the field resulting from the coil 23. At this instant the bar has traversed one-half of a revolution from the E position to the W position. As the bar moves toward the S or South position through 270°, the magnetic field produced by coil 23 will oppose the traversing flux through the bar, thereby causing a negative current for the remainder of the revolution as clearly shown in Fig. 5 between the ordinates 180 and 360. With the addition of the direct current in the coil 23, the curve of Fig. 5 shows one positive maximum and one negative maximum point. It will now be apparent that the coil 23 constitutes a means providing a field which assists or resists the earth's field dependent upon the position in azimuth of the apparatus, and thereby overcomes the 180° ambiguity which would result if no such pre-magnetization had been provided. The effect of the direct current may be removed by means of a rectifier, as will be presently described in connection with Fig. 10, and the value of the varying current due to the earth's magnetic field may be ascertained by use of an indicator in the circuit of coil 20 as indicated at 38 in Fig. 10. The influence of coil 23 upon the arrangement is shown in Fig. 5 which illustrates the effective value of the current in coil 20 relative to the angular position of said coil in the terrestrial field. The frequency of this current is determined by a full revolution of the core, thus giving an indication of the polarity of the coacting field.

Figure 9:
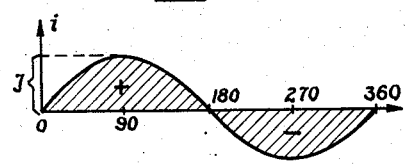
Fig. 9 is also a diagram of current flowing in the coil of Fig. 6.

In order to simplify the arrangement of Fig. 4 and to avoid the necessity for a supplementary coil 23, it is possible to energize coil 20 by a direct current which is interrupted by a mechanical interrupter (not shown), thus providing a periodically varying direct current, for example, from a source 25. The necessary varying magnetic field may also be produced from a partially rectified alternating current, for example, an alternating current which has passed through a half-wave rectifier. This current may be considered to be replaced in effect by a constant direct current $i_c$ and a sinusoidal alternating current $i_a$. By means, for example, of a bridge connection, to appear later, it is possible to remove the effect of the direct current value $i_c$ and to consider the sinusoidal current alone, as shown in Fig. 9, in making direction measurements. The instantaneous value of the current as shown in Fig. 9 for a given angular displacement $\alpha$ of coil 20, from the east-west position, is expressed by the formula $i = J \sin \alpha$, where $J$ is the maximum value of the current.

Figure 8:
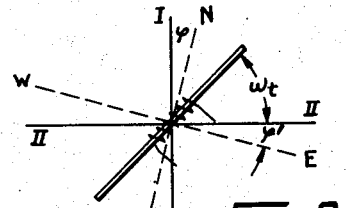
Fig. 8 is a view illustrating the position of a magnetic core and coil relative to a magnetic meridian and to the axes of a vehicle.

In Fig. 8 is represented the instantaneous position of the rotating coil 20 relative to the magnetic meridian N—S, and the longitudinal axis I—I of an aircraft having a transverse axis II—II. The axis I—I is angularly displaced from the magnetic meridian N—S by an amount $\phi$ while the transverse axis II—II is displaced from the east-west position an equal amount $\phi'$. In order that $\phi$ or $\phi'$ may be measured and may establish the position of the aircraft relative to the magnetic meridian when the coil 20 is rotated, the transverse axis II—II is taken as the reference direction for the calculations of the current at any given time. For example, referring to Figs. 8 and 9, $i = J \sin(Wt + \phi)$, where:

$J$ = maximum instantaneous current;
$Wt$ = the angle traversed in $t$ seconds at an angular velocity $W$; and,
$\phi$ = the course of the aircraft.

Figure 10:
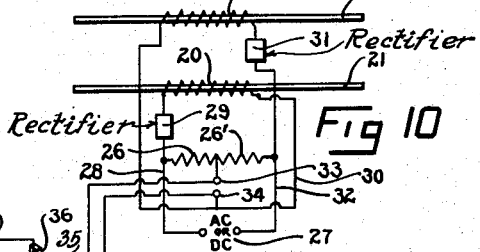
Fig. 10 is a diagram of the wiring which may be employed in one embodiment of the present invention; and, Fig. 11 is an isometric view of an embodiment of the invention employing the wiring shown in Fig. 10.

Novel means for measuring $\phi'$ are provided in the embodiment illustrated in Fig. 10 comprising the above-mentioned bridge connection wherein two branches of the bridge are constituted by coils 20, 20' upon cores 21, 21'. The other two branches of the bridge comprise, for example, the resistances 26, 26'. The apparatus may be mounted in suitable gimbal rings (not shown) and adapted for rotation about an axis perpendicular to the plane determined by said coils. For reasons above explained, it is necessary, in order to produce a favorable curve of the current, to energize said coils by either an interrupted direct current or a partially rectified alternating current. Consequently, means are provided for interrupting a direct current or partially rectifying an alternating current, as the case may be. In Fig. 10, one side of the energy source 27, which may produce either direct or alternating current, is connected by a lead 28 to branch 26 and coil 20 through a member 29 which, as above set forth, may be either a partial rectifier or an interrupter. Coil 20 is in connection with coil 20' through lead 30. The opposite extremity of the latter coil, in turn, is connected to the branch 26' and to the opposite side of the energy source 27 through a member 31 by means of a lead 32. Member 31 also may be either a partial rectifier or an interrupter as above set forth. Means for indicating the direction of the earth's field by the current or voltage flowing in the bridge may be connected at terminals 33, 34 which are connected across the bridge in a conventional manner. If the bridge here described revolves with constant angular velocity in the magnetic field of the earth, terminals 33, 34 constitute, in a sense, the terminals of a generator which delivers a sinusoidal current as represented in Fig. 9.

The above-mentioned means for indicating the direction of the earth's field in accordance with the bridge current or voltage comprises, for example, a two-part commutator 35 (Fig. 10) having sections 35a, 35b which are, respectively, connected to terminals 33, 34. Diametrically opposed brushes 36, 36 in contact with said commutator are connected by leads 37, 37 to an ammeter 38 which is suitably calibrated in degrees for azimuth measurements. Brushes 36, 36 may be angularly shifted about said commutator.

In operation of the embodiment of Fig. 10, the coils 20, 20' are rotated about a vertical axis located centrally therebetween. E. M. F.'s of similar amplitudes and direction are induced in each of the coils for the reasons as discussed in connection with Figs. 1 to 9, inclusive. Partial rectifiers 29 and 31 are used with each of the coils. Rectifier 29 may be a half-way rectifier cutting off all of the negative peaks of the current of one coil while the other rectifier 31 will cut off all the positive peaks of the second current of the other coil so that a current will be produced as disclosed in Fig. 9 where the positive peak of rectifier 29 will act in unison with the negative peak of rectifier 31. As will now be apparent, the direction of the flow of current is reversed for opposite directions of deviations and the error of 180° ambiguity is overcome.

The rotating bridge constitutes in effect an armature of a bi-polar generator. The strength and polarity of the indication of the relative position of the earth's field and the craft heading of the arrangement is determined by the angular position of the brushes 36, 36 with respect to the earth's field. A reference brush position and a reference point upon the ammeter 38 are first established by angularly shifting said brushes to a point where no current is indicated at the ammeter when the longitudinal axis of the craft is pointing to the magnetic north. This may be accomplished by rotation of coils 20 and 21' until they lie in an E—W position where no current is induced by the earth's magnetic field. With this setting, the mean value of current traversing the coils due to the source 27 may be noted on the ammeter 38, and the brushes 36 are then shifted to the position where each contacts both of the segments of the commutator, permitting the needle to fall back to zero on the ammeter since no current is taken off by the brushes at this new reference position. The reading of the mean value of current as indicated on the ammeter will then constitute a reference point with which the direction and amplitude of the induced currents can be ascertained. When the craft changes from a course heading, for example, due north by an amount $\phi$ (Fig. 8), the brush axis will be shifted from the reference position a similar amount which will be indicated at the ammeter 38 by a current corresponding in value to the course change. If the axis of the craft turns to a position away from the north, the induced currents will be additive with the alternating current acting in the coils, as previously explained in connection with Figs. 1 to 9, inclusive, and the needle will deflect past the reference point of the instrument 38. The current indication will exceed the mean value of the alternating current for 180° but as soon as the craft is at an E—W position and begins to turn toward the S position, the current taken off by the brushes will be less than the mean value as indicated by the reference point in accordance with the above description. Any subsequent change in course will be similarly indicated.

In the embodiment shown in Fig. 11, the bridge connection as illustrated in Fig. 10 is mounted for rotation in a stabilized gimbal ring arrangement. The coils 20, 20', which are connected to suitable sources of electrical energy by means of slip rings (not shown) surround cores comprising central parallel arms 39, 39 of a strip 40 which is rotatably mounted upon a shaft 41 of a constant speed motor 42, for example, by means of a U-shaped portion 43. The upwardly extending arms of portion 43 are secured to the strip 40 and the base thereof is centrally attached to shaft 41 of said motor. In order to strengthen the gyroscopic stabilizing effect of the rotating arrangement, the strip 40 may be provided with weights 40', 40' at either extremity thereof. Motor 42 is secured to the base of a gimbal ring 44 having trunnions 45, 45 which are supported by a second ring 46. Ring 46, by means of trunnions 47, 47 which are axially perpendicular to the former trunnions, is supported upon shoulders 48, 48 which, in turn, are mounted upon the aircraft. The rotating coils thus are provided with three degrees of freedom.

The remaining branches of the bridge comprising resistances 26, 26' and the interrupter or rectifying members 29 and 31 (not shown in Fig. 11) may be mounted in a suitable container 49. The terminals 33, 34, externally secured to said container are connected in Fig. 11 to the bridge and to the commutator 35 in a manner corresponding to that of Fig. 10. A second U-shaped portion 50, in the form shown, is adapted for holding the container 49 and also for holding a shaft 51 which is coaxial with shaft 41. Commutator 35 is mounted upon shaft 51 and adapted for rotation therewith.

Instead of indicating the magnetic meridian by an adjusted ammeter which responds to the position of the brush axis relative to said meridian, the embodiment shown in Fig. 11 employs a motor 52 which is energized by the current taken from the angularly shiftable brushes 36, 36. Motor 52 in a manner to appear later provides a continuous automatic indication of the magnetic north.

Means are provided for adjusting the brushes 36, 36 in accordance with the current flowing therethrough comprising a shaft 53, coaxial with shafts 41, 51. Shaft 53 is rotatably mounted in a bore at the upper portion of gimbal ring 44 and is provided with a worm wheel 53a integral therewith. Rigidly attached to the lower extremity of shaft 53 is a brush holding frame 54 to which said brushes are attached in a conventional manner and adapted for wiping contact with commutator 35. Brushes 36, 36 are electrically connected to the motor 52 by leads 55, 55. Motor 52 is rigidly mounted upon a shelf portion 44a of ring 44 and is operatively connected by means of a worm 56 with the wheel 53a.

Means are provided which move in response to the movements of the brush axis for indicating the magnetic meridian comprising a compass disc 57 which is operatively connected with shaft 53. A suitable plate 58 attached to the vehicle is associated with disc 57 bearing a reference mark 58a against which said disc may be read.

Although the gyroscopic effect of the rotating strip 40 mounted in the above-described gimbal ring suspension will serve to maintain the coils 20, 20' in the horizontal plane, additional stabilizing means are provided comprising a gyroscope having a housing 59 in conventional gimbal ring suspension constituted by a gimbal ring 60 which supports housing trunnions 59a, 59a. A pair of trunnions 60a, 60a upon said ring are supported by shoulders 61, 61 which, in turn, are secured to the craft. The stabilizing action of said gyroscope about the axis of trunnions 59a, 59a is communicated to the gimbal ring 44 and hence to the axis of rotation of the arrangement mounted thereon, by means of a device which actuates a servo-motor in response to the movements of the gyroscope about said axis. The device is constituted by a U-shaped frame piece 62 having the downwardly extending arms thereof rigidly secured to gyro-housing 59. Centrally disposed upon said frame piece is a rod 63 which is coaxial with the gryroscopic axis of rotation. Rod 63 moves between two adjacent semi-circular rims 64a, 64a of a split semi-circular portion 64 to which, at either extremity thereof, the trunnions 65, 65' are attached and rotatably mounted upon shoulders 66, 66. Only the motion of rod 63 about the axis of trunnions 59a, 59a is communicated to the semi-circular portion 64. The axis of the trunnions 65, 65' are preferably in the same plane with trunnions 59a, 59a.

Operatively connected to the outer extremity of trunnion 65' is a contact arm 67 which moves between double contacts 68, 69 of a servo-motor mechanism which follows the movements of gyroscope 59. Contacts 68, 69 are mounted upon a sector 70 of a worm wheel which is coaxial with trunnion 65' and is in operative engagement with a worm 71 upon a shaft 72 of a motor 73, said shaft being mounted in suitable bearings 74. Motor 73 is energized by a suitable energy source (not shown) and is connected to contacts 68, 69 by leads 75, 76, respectively. Arm 67 and a central contact of said motor are connected to said energy source by leads 77, 78, respectively. A split semi-circular portion 79 similar in construction to member 64 is mounted adjacent gimbal rings 44, 46 such that shaft 53 extends between the semi-circular rims 79a, 79a. Trunnions 80, 80' attached to said portion are mounted upon shoulders 81, 81 and are parallel to trunnions 65, 65'. Motor 73 is operatively connected to the semi-circular portion 79 by means of a worm 82 upon shaft 72 which meshes with a worm wheel 83 mounted upon trunnion 80'.

In operation, motor 42 rotates coils 20, 20' at a constant angular velocity. As in the previous embodiment, the output of the bridge arrangement is constituted by an effective sinusoidal current which flows to the segments of the commutator 35. The brushes convey any current flowing therethrough to motor 52 which, by means of worm and wheel 56 and 53a, respectively, angularly readjusts the brushes to the zero position or the position where no current flows. Since the zero position of the brushes is determined by the direction of the earth's field, the magnetic meridian can always be determined thereby. The disc 57 operatively connected to brush frame 54 is adjusted to indicate the magnetic north when the brushes are in the zero position.

If the vehicle upon which the apparatus is mounted is holding a course due north, the reference mark 58a will indicate zero degrees upon disc 57. No current will flow in brushes 36, 36 and motor 52 will be inoperative. However, if a course change to the left occurs, for example, of 30°, the brushes will be angularly displaced by that amount which, due to the generator action of the arrangement will cause a corresponding current to flow in said brushes to motor 52 which will rotate the brush frame in an opposite direction to regain the zero position, thus compensating for the displacement. Since the compass disc 57 moves with said brushes and frame the magnetic north will still be indicated upon the disc and the reference mark 58a will indicate a course of 330°.

In operation of the stabilizing arrangement associated with the apparatus, a movement of the gyroscope within housing 59 about the axis of trunnions 59a, 59a will cause the semi-circular portion 64 to move therewith to displace contact arm 67 from the central position relative to contacts 68, 69. Shaft 72 of servo-motor 73 will rotate in a clockwise or counter-clockwise direction in accordance with the contact which is engaged by arm 67. The rotation of shaft 72 causes the semi-circular portion 79 to move with the semi-circular portion 64. The rotation of said shaft continues until the worm and sector arrangement moves contacts 68, 69 whereby the contact arm 67 is again centered therebetween. Thus, the axes of revolution of said gyroscope and of coils 20, 20' are caused to move in parallel planes.

There is thus provided a novel magnetic compass which produces an accurate indication of the magnetic meridian and which is sensitive to minute changes in the course of the vehicle upon which it is mounted. The apparatus is self-stabilizing and is able to remain in the proper operating position without the aid of supplementary apparatus. The compass furthermore provides a continuous indication of the magnetic north and avoids the necessity of making several readings before the meridian is determined. The apparatus may be suitably compensated by conventional means (not shown) for the effect of local magnetic disturbances.

Although only two embodiments of the present invention have been illustrated and described in detail, it is to be expressly understood that the invention is not limited thereto. Various changes may also be made in the design and arrangement of the parts without departing from the spirit and scope of the invention, as the same will now be understood by those skilled in the art. For a definition of the limits of the invention, reference will be had primarily to the appended claims.

What is claimed is:

1. In an earth inductor compass for a craft, a bridge circuit having a coil provided with a core, said coil and core comprising an armature arranged for rotation in the earth's magnetic field, means supplying periodically varying current to said bridge circuit, means for rotating said coil and core in the earth's magnetic field at uniform speed, commutating means rotating synchronously with said armature and electrically connected to said bridge circuit, azimuthally adjustable brushes contacting said commutating means for collecting the current induced in said coil, means responsive to current flow in said brushes as the craft changes heading for automatically adjusting said brushes to stabilize the latter in azimuth, and means including an indicating device connected to be moved with said brushes for ascertaining the angular shift of said brushes in azimuth as a function of the change in heading.

2. In an earth inductor compass for a craft, a bridge circuit having a coil provided with a core, said coil and core comprising an armature arranged for rotation in the earth's magnetic field, means supplying periodically varying current to said bridge circuit, means for rotating said coil and core in the earth's magnetic field at uniform speed, means mounting said coil for freedom about three mutually perpendicular axes, commutating means rotating synchronously with said armature and electrically connected to said circuit, azimuthally adjustable brushes contacting said commutating means for collecting the current induced in said coil, means responsive to current flow in said brushes as the craft changes heading for automatically adjusting said brushes to stabilize the latter in azimuth, means including an indicating device connected to be moved with said brushes for ascertaining the angular shift of said brushes in azimuth as a function of the change in heading, and means including a gyro and a connection between said gyro and said mounting means whereby said coil is maintained in a horizontal plane in the earth's field.

3. In an earth inductor compass, a bridge circuit having a plurality of coils, magnetically permeable cores for each of said coils, means for mounting said coils and cores for rotation as a unit in azimuth, means for constantly rotating said coils in azimuth whereby currents are induced in said coils due to the horizontal component of the earth's magnetic field, means for supplying a periodically varying current to said circuit for producing a uni-directional field acting additively with said induced currents during one-half of a revolution of said coils and in opposition to the induced currents during the other half revolution thereby producing with said induced currents sinusoidal currents in said coils, commutating means rotating synchronously with said coils for collecting said sinusoidal currents, and indicating means connected to said commutating means and actuated by said sinusoidal currents.

4. In an earth inductor compass, a bridge circuit having a plurality of coils, magnetically permeable cores provided for each of said coils, means mounting said coils and cores for rotation as a unit in azimuth whereby currents are induced in said coils due to the horizontal component of the earth's magnetic field, means supplying a periodically varying current to said circuit whereby said induced currents act additively with said periodically varying current to produce a sinusoidal current in each of said coils, means modifying said sinusoidal currents so that the frequency thereof is equal to the rotational speed of said coils, commutating means rotating with said coils and electrically connected thereto for collecting said sinusoidal currents, and indicating means electrically connected to said commutator.

5. In an earth inductor compass for a craft, a bridge circuit having a plurality of coils, magnetically permeable cores provided for each of said coils, means mounting said coils and cores for rotation as a unit in azimuth, means for so rotating said coils and cores whereby currents are induced in said coils due to interaction with the horizontal component of the earth's magnetic field, means supplying a periodically varying current to said circuit, means electrically connected with said circuit for rectifying said periodically varying current whereby said rectified currents act additively with said induced currents to produce sinusoidal currents in said coils having a frequency equal to the rotational speed of said coils, a commutator rotating synchronously with said coils and cores for collecting said sinusoidal currents, azimuthally adjustable brushes contacting said commutator and rotatable about said commutator, means electrically connected to said brushes and responsive to change of current flow therein upon azimuthal deviation of said craft, and a measuring device connected to move with said brushes and actuated by said responsive means to reset the brushes and cause said measuring means to indicate said azimuthal deviation.

GUSTAV BARTH.